Figure 1:
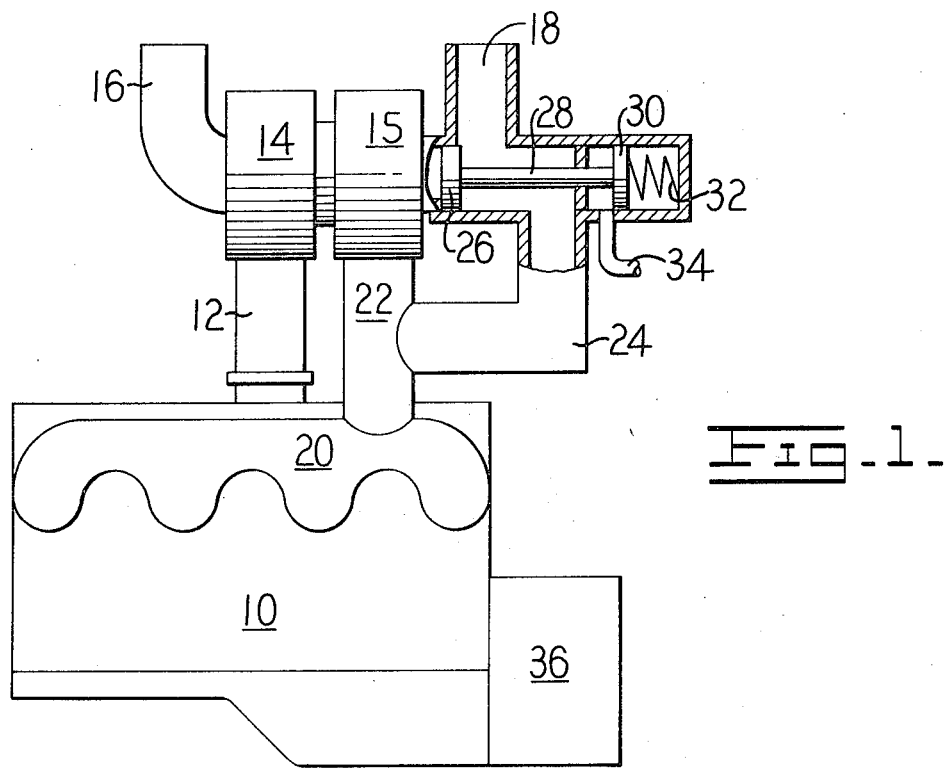

United States Patent
Glassey et al.

[15] 3,651,636
[45] Mar. 28, 1972

[54] TURBOCHARGER CONTROL

[72] Inventors: Stephen F. Glassey, East Peoria; George E. Olson, Lacon, both of Ill.

[73] Assignee: Caterpillar Tractor Co., Peoria, Ill.

[22] Filed: Oct. 2, 1969

[21] Appl. No.: 863,123

[52] U.S. Cl. .................................................................60/13
[51] Int. Cl. .................................F02b 33/44, F02b 37/08
[58] Field of Search ......................................................60/13

[56] References Cited

UNITED STATES PATENTS

| | | | |
|---|---|---|---|
| 3,174,468 | 3/1965 | Newsom | 123/198 D |
| 2,816,533 | 12/1957 | Reggio | 123/139 |
| 3,270,724 | 9/1966 | Dolza | 60/13 |
| 3,049,865 | 8/1962 | Drayer | 60/13 |

FOREIGN PATENTS OR APPLICATIONS 732,072   2/1943   Germany .................................60/13

Primary Examiner—Mark M. Newman
Assistant Examiner—Douglas Hart
Attorney—Fryer, Tjensvold, Feix, Phillips & Lempio

[57] ABSTRACT

A control for the turbocharger of an internal combustion engine which includes means to stop the flow of air through the turbocharger compressor when the engine is operating at low speed to reduce resistance to rotation of the turbocharger. The air flow is reestablished automatically upon increase in speed or load of the engine and turbocharging is commenced without undue delay because the turbocharger compressor is already rotating at a relatively high rate of speed.

4 Claims, 2 Drawing Figures

Patented March 28, 1972

3,651,636

INVENTORS
STEPHEN F. GLASSEY
GEORGE E. OLSON
BY
ATTORNEYS

TURBOCHARGER CONTROL

One advantage of using a turbocharged engine is that a smaller engine may be used for a given power output when compared to a naturally aspirated engine. A disadvantage of the turbocharged engine is the relative slow acceleration time caused by the fact that insufficient exhaust energy is available at slow or low idle operation of the engine to drive the exhaust turbine and thus the turbocharger compressor at high speed. For example, when the engine is idling with no load or a light load, the turbocharger speed is reduced and the BMEP of the engine is comparable to that of a naturally aspirated engine. When a load is encountered as when pressure is depleted in an air compressor or through the transmission of a vehicle driven by the engine, time is required for the exhaust to accelerate the turbocharger turbine which drives the compressor which in turn supplies intake air to the engine to enable it to burn more fuel to satisfy requirements for greater speed or higher load. Therefore, sufficient air is not supplied to the engine when it is first loaded and its ability to accelerate rapidly to a higher speed is limited. This condition is generally termed "-turbocharger lag."

The present invention overcomes the turbocharger lag referred to above by providing a bypass around the turbocharger compressor so that air may be directed selectively through the compressor or through the bypass when the engine is operating at low speed. A valve is employed to stop flow through the compressor and open the inlet through the bypass so that a very much decreased load is imposed upon the compressor and even though the engine is operating at low speed with minimal energy in the exhaust flow, the compressor is driven at a relatively high speed and the engine operates as a naturally aspirated engine on air flowing through the bypass. When greater speed or power is demanded, the valve is moved away from the intake of the compressor to a position where it closes the bypass and incoming air is available to the compressor. Since the compressor was already operating at high speed, the turbocharger lag is no longer present and the compressor operates instantly at very high efficiency. A more complete understanding of the invention will be gained by an understanding of the following specification which explains the invention by reference to the accompanying drawing.

Figure 2:
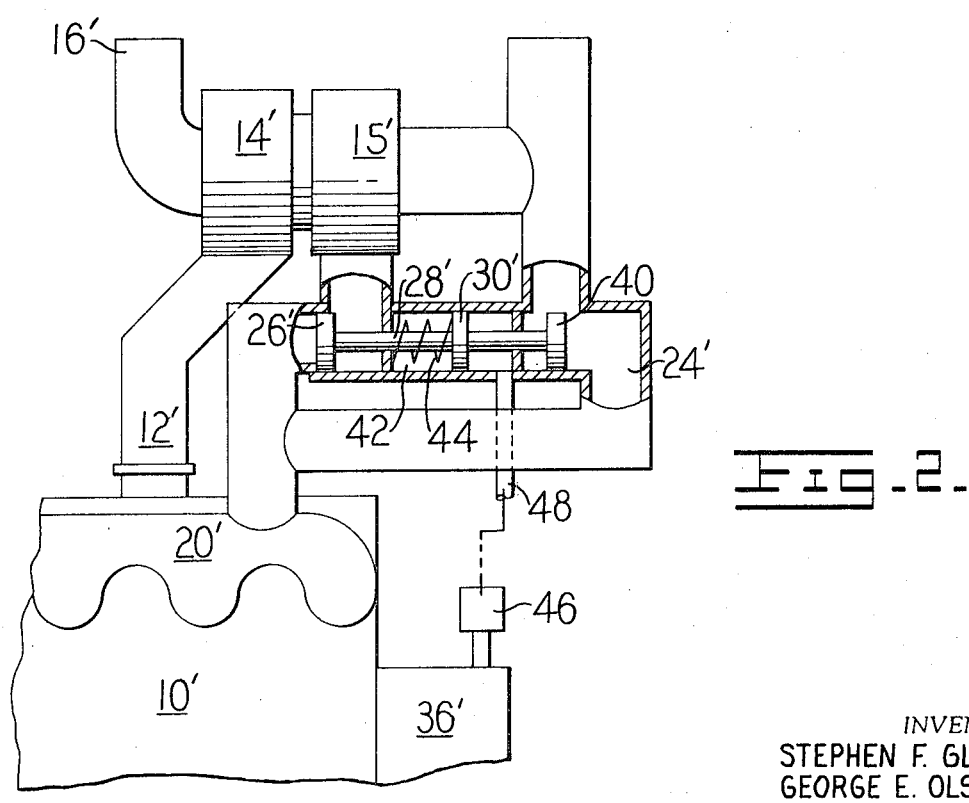

In the drawing:

FIG. 1 is a schematic view of an engine having a turbocharger and having a turbocharger control embodying the present invention and FIG. 2 is a schematic view of a similar engine and turbocharger system with a modification in the turbocharger control.

In FIG. 1 of the drawing, an engine 10 is shown as having an exhaust stack 12 which directs exhaust gas under pressure to a turbine 14 of the turbocharger before the air is exhausted to atmosphere through an outlet 16. The turbine 14 drives a compressor shown at 15. Details of construction of the turbine and compressor are conventional and well known and are therefore not disclosed herein. Air enters the engine through an intake 18 generally preceded by an air cleaner (not shown) and may be directed to an intake manifold 20 of the engine through the compressor and a line 22 or alternately through a bypass line 24. The path taken by the air is controlled by a valve shown at 26 as closing the passage to the compressor and admitting air through the bypass 24 so that the engine would be operating in the naturally aspirated state.

The valve 26 is connected by a rod 28 with a piston 30 in a suitable cylinder and the valve is urged toward its closed position by a spring 32. A fluid under pressure is delivered to the cylinder to oppose the force of the spring 32 through a conduit 34. This fluid may be a fluid which is pressurized by engine operation such, for example, as lubricating oil, hydraulic fluid supplied under pressure by engine operation or even air which is pressurized by an engine driven pump. In either event, an initial increase in engine speed directs fluid to the rod side of the piston 30 collapsing the spring 32 and moving the valve from the position shown to a position in which it opens the intake of the compressor 15 and closes the inlet to the bypass line 24. Thus, when greater energy is demanded of the engine as, for example, by depletion of the pressure in a compressor represented at 36 being driven by the engine, air will flow through the turbocharger compressor immediately and due to the fact that its speed had been maintained while the engine was idling, the turbocharger lag will have been prevented.

A modified form of the invention shown in FIG. 1 is illustrated in FIG. 2 wherein parts corresponding to parts shown in FIG. 1 are indicated by the same reference characters primed. In this case, a valve element 26' closes the discharge side of the compressor and is on a rod 28', the opposite end of which carries a valve element 40 adapted to close the bypass 24' to incoming air. A piston 30' on the rod 28' is disposed within a cylinder 42 and a spring 44 urges the valve 40 toward its closed position. In FIG. 2 the engine is shown as operating an air compressor 36' and pressure of air therein flows through a control valve 46 and line 48 to the cylinder 42 where it overcomes the force of the spring 44, closing valve 26' and opening valve 40. This condition exists when the engine is operating at low idle and adequate pressure prevails within the compressor 36'. When air is withdrawn from the compressor which signals the engine to increase its speed by conventional means (not shown), the low air pressure is reflected in the cylinder 42 and the spring 44 opens the valve 26' to permit delivery of turbocharged air to the engine. Meanwhile, the turbocharger compressor has been operating at high speed due to the fact that the valve 26' was interrupting flow of air toward the intake manifold.

What is claimed is:

1. In a turbocharged internal combustion engine including an engine intake and exhaust manifold, a turbo-compressor outlet conduit means communicating with said intake manifold, a turbine means for driving said turbo-compressor having inlet and outlet means, said turbine means inlet means communicating with said exhaust manifold, the improvement comprising; bypass conduit means communicating said turbo-compressor inlet conduit means with said intake manifold, valve means which simultaneously control the flow of engine intake pressure fluid through said turbo-compressor and through said bypass conduit means, said valve means being biased toward a first position by spring means and actuated toward a second position by means of positive fluid pressure and means to supply said positive fluid pressure to actuate said valve means toward said second position automatically in response to a change in demand on said turbocharged internal-combustion engine, said valve means, in said second position closing off said turbo-compressor outlet means while simultaneously allowing fluid flow to said intake manifold through said bypass conduit means so that said engine then operates on normally aspirated intake fluid and said turbo-compressor rotates freely without pumping fluid.

2. The invention of claim 1 wherein the source of said positive fluid pressure for automatically actuating said valve means toward said second position is engine lubricating oil.

3. The invention of claim 1 wherein the source of said positive fluid pressure for automatically actuating said valve means toward said second position is hydraulic fluid.

4. The invention of claim 1 wherein said means to supply positive fluid pressure comprises an air compressor driven by said turbocharged internal combustion engine.

* * * * *